(No Model.) 2 Sheets—Sheet 1.
G. W. GARDANIER.
QUADRUPLEX TELEGRAPH.
No. 298,571. Patented May 13, 1884.
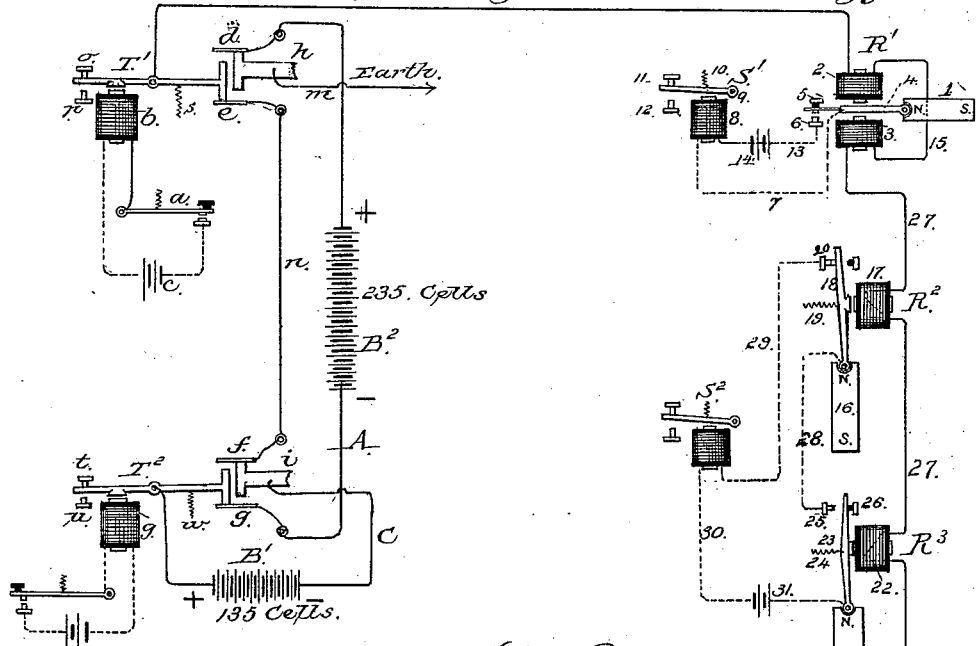
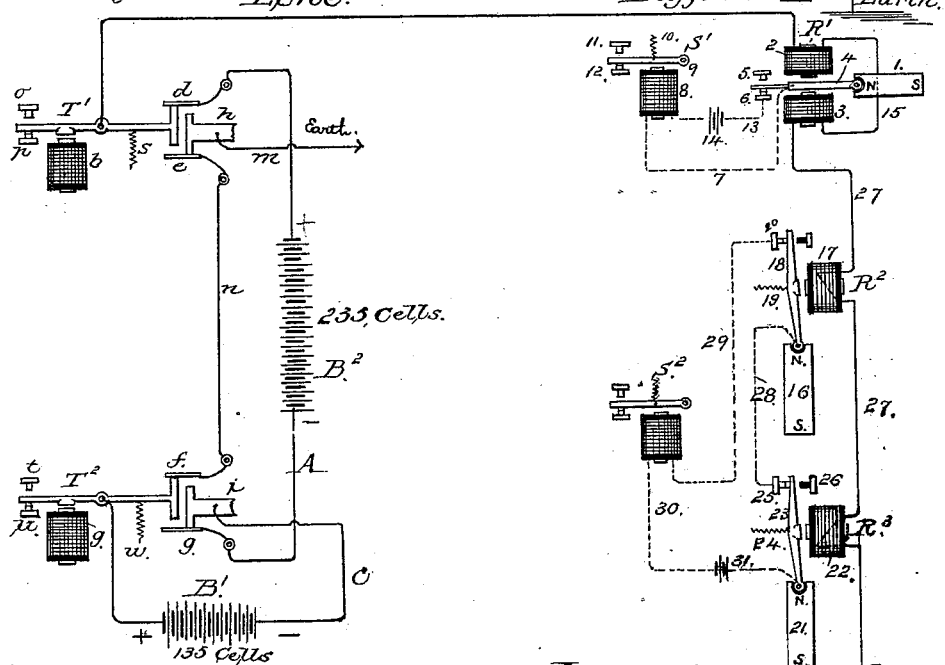
Attest:
T. Walter Fowler
Herman Gustow
Inventor:
George W. Gardanier,
By Chas. C. Gill
Attorney

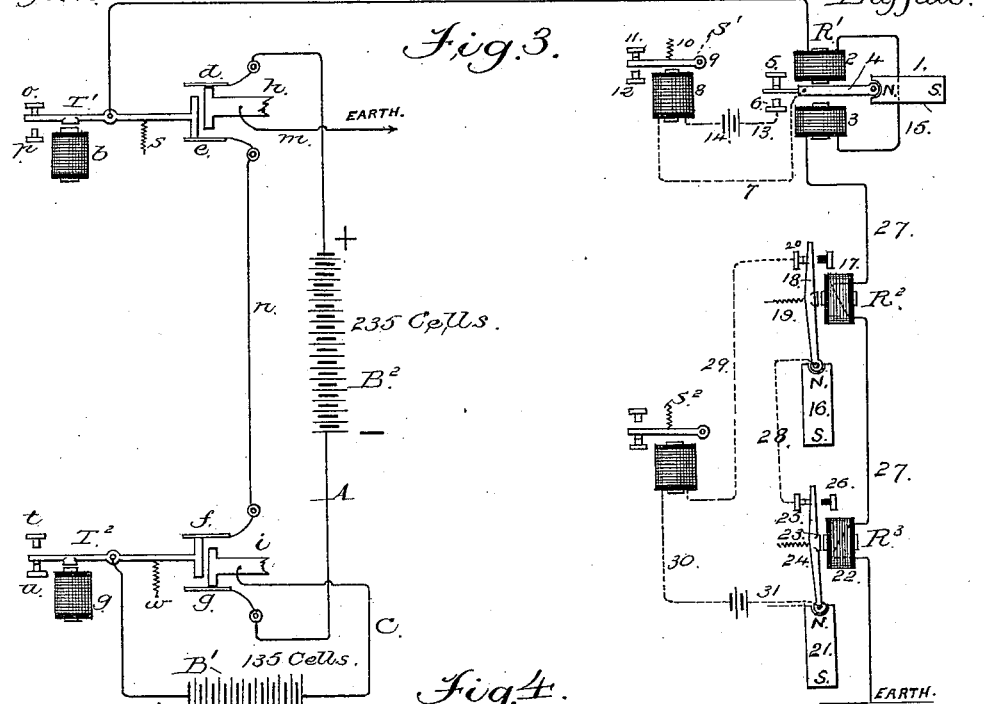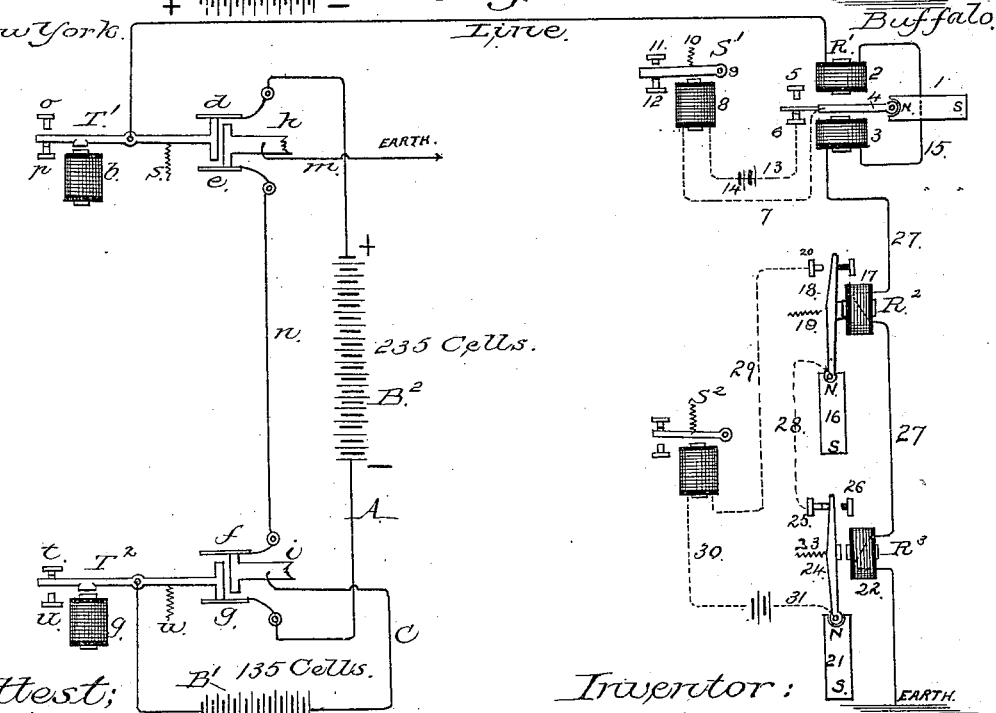

UNITED STATES PATENT OFFICE.

GEORGE W. GARDANIER, OF SARATOGA SPRINGS, NEW YORK.

QUADRUPLEX TELEGRAPH.

SPECIFICATION forming part of Letters Patent No. 298,571, dated May 13, 1884.

Application filed October 24, 1883. (No model.)

*To all whom it may concern:*

Be it known that I, GEORGE W. GARDANIER, a citizen of the United States, and a resident of Saratoga Springs, in the county of Saratoga and State of New York, have invented certain new and useful Improvements in Quadruplex Telegraphy, of which the following is a specification.

The invention relates to improvements in quadruplex telegraphy; and it consists, essentially, in a system for multiple transmission in the same direction in which the entire main battery at one or each station is always in circuit, in which three separate relays are employed for receiving or recording two independent sets of signals or messages, and in which the potential of the current may be varied without regard to its polarity by reversing the poles of the smaller section of the battery with respect to the poles of the larger section thereof, all as hereinafter more fully described.

In the accompanying drawings I illustrate apparatus which may be employed for transmitting two separate and distinct messages simultaneously in the same direction, with the appropriate receivers; but it will appear obvious, of course, to those skilled in the art to which the invention pertains that by having a complete set of the sending and receiving apparatus at each station it will constitute a quadruplex system, or one which will permit the simultaneous transmission of four messages—two in each direction—over the same conductor, or that the apparatus illustrated may be combined with any of the well-known differential duplex methods for simultaneous transmission in opposite directions.

The drawings represent the conditions of the apparatus due to the four different positions of the transmitters, Figure 1 illustrating the same when both transmitters are open, Fig. 2 when both transmitters are closed, Fig. 3 when transmitter T' is open and transmitter T" closed, and Fig. 4 when transmitter T' is closed and transmitter T" open.

I will first describe the apparatus in detail, and then point out its operation under the various positions of the keys or transmitters.

Referring to the sending-station, (represented by New York, for example,) T' and T" respectively denote the transmitters, (commonly known as "pole-changers" or "double-current transmitters,") which may be actuated by direct application or by means of a finger-key, $a$, electro-magnet $b$, and local battery $c$ in the customary manner. The rear end of each transmitter T' and T" is arranged to play between the circuit spring-contacts $d$ $e$ and $f g$, respectively, as indicated, and directly in rear of each transmitter is supplied the fixed contact, (lettered $h$ and $i$, respectively.) From the contact $h$ a conductor, $m$, leads to earth. The lower spring-contact, $e$, of transmitter T' is connected by a branch wire, $n$, with the upper circuit spring-contact, $f$, of transmitter T", while the upper spring, $d$, of transmitter T' is connected with the lower spring-contact, $g$, of transmitter T" by the branch wire A, which includes the larger section B" of the transmitting-battery, said section consisting, say, for purposes of description, of two hundred and thirty-five cells. The smaller section B' of the battery, consisting of, say, one hundred and thirty-five cells, is included in the branch wire C, which passes from the fixed contact $i$ to the transmitter T".

The transmitter T' has on opposite sides of its front end the resting-contacts $o$ $p$, and at the lower side of its rear portion is applied the retractile spring $s$, which has sufficient force, when the finger-key $a$ is open, to bring said part of the transmitter down against the circuit-spring $e$, and to carry said spring away from the contact $h$. The transmitter T" is likewise provided at its front end with the resting-contacts $t$ $u$, and at its rear portion with the retractile spring $w$, which, when the finger-key operating the transmitter is open, will depress the rear end of said transmitter against the spring-contact $g$ and move said spring away from the fixed contact $i$, as indicated in Fig. 1 of the drawings.

I have described the transmitting-battery as consisting of two sections, one containing one hundred and thirty-five cells and the other two hundred and thirty-five cells, making a total electro-motive force of three hundred and seventy volts, this being about the amount required for a circuit of, say, five hundred miles, which is about the distance between New York and Buffalo, and it being considered, for purpose of illustration, that the electro-motive force of each cell is one volt. It is plain, however, that the electro-motive force of the battery may be varied at will, according to the length of the line; but it is desirable that the relative proportions of the sections to each other be preserved as nearly as may be. When the negative pole of the section B'' of the battery is connected with the positive pole of section B', the two sections will agree and give an electro-motive force of three hundred and seventy volts, and when the negative pole of section B'' is connected with the negative pole of section B' the one hundred and thirty-five cells or volts in the latter section will destroy the force of one hundred and thirty-five of the cells or volts in the section B'', and leave an electro-motive force of one hundred volts.

Without entering into a full description of the operation of the apparatus, I will here state that the transmitter T' controls the polarity of the current to the line without regard to its strength, and the transmitter T'' controls the strength of the current to the line irrespective of its polarity. Under the first condition of the transmitters—that is, when both are open—the two sections of the battery B' and B'' will agree and will give a negative (—) current of three hundred and seventy volts to the line. This is the condition illustrated in Fig. 1, and the passage of the current is through the wire A, circuit-spring g, transmitter-bar T'', branch wire C, contact i, circuit-spring f, branch wire n, spring-contact e, and transmitter T'. When both transmitters are closed, which is the second condition, and that illustrated in Fig. 2, a positive (+) current of one hundred cells will be given to the line. Under this condition the circuit is from earth through wire n, contact f, transmitter T'', wire C, wire A, spring-contact d, and transmitter T' to the line, and the negative poles of the two sections of the battery are connected, whereby the one hundred and thirty-five cells of the section B' destroy the electro-motive force of one hundred and thirty-five of the cells of the section B'', leaving a positive current of one hundred cells to the line. The third condition of the transmitters—that illustrated in Fig. 3—to wit, the transmitter T' being open and T'' closed—gives a negative (—) current to the line through the wire A, spring-contact g, contact i, wire C, transmitter T'', spring-contact f, wire n, spring-contact e, and transmitter T'. Under this condition the like poles of the sections of the battery are connected, and hence the electro-motive force of one hundred and thirty-five of the cells is destroyed, leaving a negative current of one hundred cells to the line. Under the fourth condition of the transmitters—that is, when transmitter T' is closed and T'' open—there will be a positive (+) current of three hundred and seventy volts to the line, being the full strength of both sections of the battery, and under this condition the current will pass through the wire n, circuit-spring f, contact i, wire C, transmitter T'', spring-contact g, branch wire A, spring-contact d, and transmitter T'. Thus it will be noted that when the transmitter T' is open, as in the first and third conditions above specified, there is a negative (—) current to the line; that when the transmitter T' is closed, as in the second and fourth conditions, there is a positive (+) current to the line; that when the transmitter T'' is open there is a strong current to the line, or one of the full strength of both sections of the battery, as in the first and fourth conditions, and that when the transmitter T'' is closed a weak current, or one of one hundred volts, is sent to the line, as in the second and third conditions.

From the foregoing it will appear plain that with each movement of the transmitter T' the polarity of the current will be changed, and that when the lever of transmitter T'' is released from the local magnet the strength of the current will be increased, and when said lever is depressed by the attraction of the local magnet the strength of the current will be decreased. At this point I beg to call attention to the fact that one of the transmitters alone controls the potential of the current by reversing the poles of the smaller section of the main battery with respect to the poles of the larger section thereof; that the other transmitter has absolute control of the polarity of the current, and that both sections of the battery are always in the same continuous circuit; and herein are the points of difference between the transmitting system sought to be protected by this application, and those systems heretofore known. In the patent to Muirhead and Winter, No. 227,039, for instance, it is necessary to shift the battery in the main line to the artifical line, and that in the artificial line to the main line, in order to reverse the polarity of the current. To change the strength of current, a small portion of the battery is shifted from the main to the artificial line, and vice versa, to make the small portion agree or disagree with the larger portion.

The apparatus at the receiving-station consists of the relays (lettered R', R'', and R''', respectively) and the sounders S' S''. The relay R' is an ordinary Siemens' polarized relay, consisting of the permanent magnet 1 and the electro-magnets 2 and 3, placed one on each side of the pivoted armature 4. The south end, S, of the permanent magnet 1 is left free for convenience of illustration, instead of being connected to the electro-magnets 2 and 3. The purpose of the connection is only to increase the field of magnetic force, and is not therefore necessary in all instances, as is well understood. The free end of the armature 4 plays between the resting-contact 5 and working-contact 6, and from the armature a local wire, 7, passes to the electro-magnet 8 of the sounder S', which consists of the said electro-magnet and the usual armature, 9, provided with the retractile spring 10, and adapted to move between the resting-contacts 11 and 12. From the working-contact 6 a local wire, 13, passes to the electro-magnet 8 and includes the local battery 14. The electro-magnets 2 and 3 of the relay R' are in electrical connection through the wire 15 in the usual manner. It will appear obvious that the armature 4 of the relay R', being without a retractile spring, will be attracted by the weak current of one hundred volts as well as by a strong current of three hundred and seventy volts; that a negative current of either strength from the distant station passing through the electro-magnet 2 will cause its armature to move against the resting-contact 5, and that when a positive current is on the line from the distant station the armature will be attracted to the working-contact 6 by the electro-magnet 3. The movement of the armature 4 is controlled by the polarity of the current alone.

The relay R'' consists of the permanent magnet 16, the electro-magnet 17, and armature 18, one end of the electro-magnet 17 being adjacent to the armature 18, the other end being free. The armature is polarized by the permanent magnet 16, and is provided with a retractile spring, 19, which, during the absence of a strong positive current, or one of three hundred and seventy volts in the electro-magnet 17, will hold the armature against the working-contact 20.

The relay R''' is similar to the relay R'', and consists of the permanent magnet 21, the electro-magnet 22, and the armature 23, provided with the retractile spring 24, and adapted to move between the working-contact 25 and resting-contact 26. From the electro-magnet 3 of the relay No. 1 the wire 27 passes to the electro-magnet 17 of relay R'', thence to the electro-magnet 22 of the relay R''', whence it passes to the earth. The current passes around the electro-magnets 17 and 22 in opposite directions, and this may be accomplished either by winding the wire in one direction around the electro-magnet 17 and in an opposite direction around the magnet 22, or, when both relays are wound in the same direction, by connecting the incoming wire to the outside of the helix of one relay and to the inside of the helix of the other relay. In the drawings I have indicated the direction of the current around the magnets 17 and 22 by dotted lines. The object in passing the current around the electro-magnets 17 and 22, respectively, in opposite directions is, by a positive current, to render the front end of the magnet 17 south and the corresponding end of the other magnet 22 north, a negative current having the opposite effect. The purpose of this arrangement of the currents will be understood from the description hereinafter presented. The armature 18 of the relay R'' is connected by a local wire, 28, with the working-contact of the relay R'''. From the working-contact 20 of relay R'' a local wire, 29, passes to the electro-magnet of the sounder S'', and from the opposite side of the sounder a wire, 30, passes to the armature 23 of relay R''' and includes the local battery 31.

It will be understood from the foregoing that a strong positive (+) current passing through the relay R'' will render the end of the electro-magnet 17 adjacent to the armature 18 south, and that the armature being polarized north it will be attracted against its resting-contact, as denoted in Fig. 1, while a weakened positive (+) current would permit the spring 19 to retract the armature against the working-contact 20. A strong negative (—) current from the distant station, passing through the electro-magnet 17, would have no attraction for the armature 18; but upon going around the electro-magnet 22 of relay R''' in an opposite direction to its path around the magnet 17 it will make the end of said magnet nearest to the armature 23 south, and hence, the armature being polarized north, will be attracted against the insulated contact 26. A weakened or reversed current in the electro-magnet 22 will leave the armature 23 unaffected against its working-contact, the strong reversed current repelling the armature, and a weak negative (—) current being unable to overcome the tension of the retractile spring 24. Thus, when the transmitter T'' is open, sending a strong current to the line, the armature 16 of relay R'' will be attracted by the influence of a positive current on the electro-magnet 17, breaking the contact at 20 and opening the sounder S'', and the armature 23 of relay R''' will be attracted by the electro-magnet 22 when a negative current is passing around it, breaking the contact at 25. When a weak current, whether + or —, is on the line, as under the second and third conditions of the transmitters, the retractile springs 19 and 24 will retain the armatures 16 and 23 against the contacts 20 and 25 and close the sounder S'' through the wires 28, 29, and 30, leaving the sounder S' alone to respond.

It is to be noted that the second main-line relay responds to an increase in potential of a positive current only, and that the third main-line relay responds to an increase in potential of a negative current only.

What I claim as my invention, and desire to secure by Letters Patent, is—

1. The combination, at the sending-station in a multiple-telegraph system, of a main line, two keys or transmitters, a main battery divided into two sections, and branch circuits, one section of the battery having a greater electro-motive force than the other, the entire battery being always in the same continuous circuit, one of the keys or transmitters alone controlling the potential of the current by reversing the poles of the smaller section of the main battery with respect to the poles of the larger section thereof, and the other key having absolute control of the polarity of the current, substantially as set forth.

2. The combination, at the sending-station in a multiple-telegraph system, of a key or transmitter connected with the main line and playing between two circuit-contacts, a second key or transmitter playing between two circuit-contacts, a conductor connecting the lower contact of the first key or transmitter with the upper contact of the second key or transmitter, a conductor connecting the upper contact of the first key with the lower contact of the second key and including a section of the main battery, and a branch passing from the second key or transmitter to the stationary contact located between the two circuit-contacts of said key and including another section of the main battery, both sections of the battery being always in the same continuous circuit, substantially as set forth.

3. The combination, at the receiving-station in a multiple-telegraph system, of a main-line relay the armature of which is actuated by a current of either polarity from the distant station, a second main-line relay which responds to an increase in potential of a positive current only, and a third main-line relay which responds to an increase in potential of a negative current only, the second and third relays operating jointly to receive one set of signals, substantially as set forth.

4. The combination, at the receiving-station in a multiple-telegraph system, of a main line, a main-line relay and a sounder, the armature of the relay being without retractile spring, and hence repeating signals by a reversal of the polarity of the current to the line at the distant station, with a second and third main-line relays operating jointly to receive one set of signals, a second sounder and branch wires, the second relay responding to an increase in the potential of a positive current only, and the third relay responding to an increase in the potential of a negative current only, substantially as set forth.

5. In a multiple-telegraph system, the combination, at the sending-station, of a main line, two keys or transmitters, a main battery divided into two sections, and branch circuits, both sections of the battery being always in continuous circuit, one key controlling the potential of the current and the other the polarity, with three main-line relays and two sounders with local branches at the receiving-station, the first sounder responding to signals made by the reversing of the polarity of the current to the line at the distant station, the second relay repeating signals into the second sounder when a strong positive current from distant station is decreased, and the third relay repeating signals into said second sounder when a strong negative current from distant station is decreased, substantially as set forth.

Signed at Saratoga Springs, in the county of Saratoga and State of New York, this 13th day of October, A. D. 1883.

GEORGE W. GARDANIER.

Witnesses:
A. VIELE,
D. S. WOODWORTH.